United States Patent [19]

Kemp

[11] 3,852,371
[45] Dec. 3, 1974

[54] ISOPARAFFIN-OLEFIN ALKYLATION WITH A SUPPORTED HF ANTIMONY PENTAFLUORIDE CATALYST

[75] Inventor: Jacob D. Kemp, El Cerrito, Calif.

[73] Assignee: Chevron Research Company, San Francisco, Calif.

[22] Filed: Apr. 11, 1973

[21] Appl. No.: 350,222

[52] U.S. Cl. .................. 260/683.47, 260/683.58
[51] Int. Cl. ............................................. C07c 3/54
[58] Field of Search..... 260/683.47, 683.51, 683.68, 260/683.58

[56] References Cited
UNITED STATES PATENTS

| | | | |
|---|---|---|---|
| 3,201,494 | 8/1965 | Oelderik et al. | 260/683.47 |
| 3,394,202 | 7/1968 | Oelderik | 260/683.68 |
| 3,678,120 | 7/1972 | Bloch | 260/668 A |

Primary Examiner—Delbert E. Gantz
Assistant Examiner—G. J. Crasanakis
Attorney, Agent, or Firm—G. F. Magdeburger; R. H. Davies

[57] ABSTRACT

Olefins are alkylated with isoparaffins by contacting an olefin-isoparaffin feed with a solid supported HF·antimony pentafluoride catalyst at reaction conditions including a temperature between 10° and 60°F, an olefin LHSV of between 0.25 and 0.9, and an olefin content in the olefin-isoparaffin net feed between 1 and 15 volume percent. A portion of the reaction zone effluent mix is recycled to the reaction zone.

6 Claims, 1 Drawing Figure

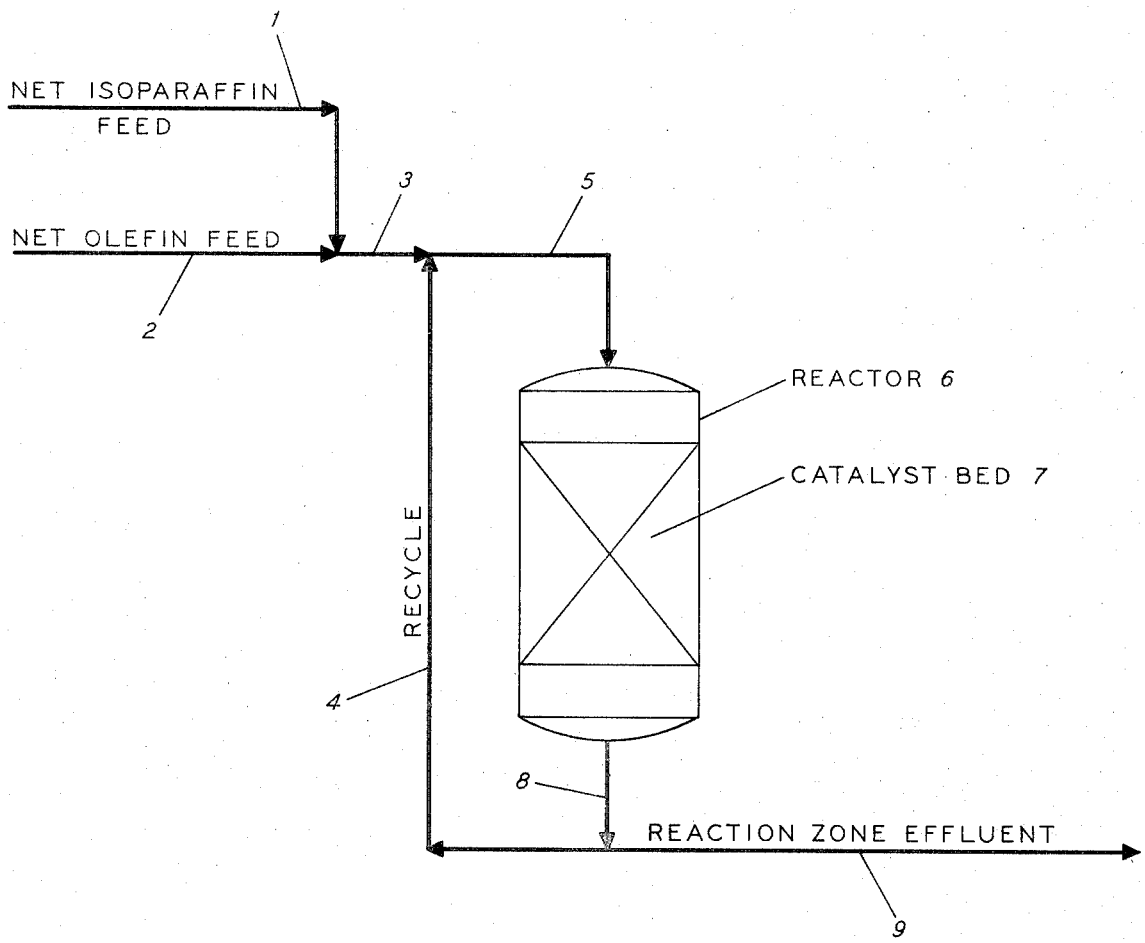

ISOPARAFFIN-OLEFIN ALKYLATION WITH A SUPPORTED HF ANTIMONY PENTAFLUORIDE CATALYST

BACKGROUND OF THE INVENTION

1. Field of the Invention

The field of art to which this invention pertains is the alkylation of isoparaffins with olefins to yield normally liquid hydrocarbons of enhanced octane number useful in gasoline blending.

2. Description of the Prior Art

The principle of alkylation as it applies to motor fuel production involves the combination of an isoparaffin, usually isobutane, with olefins such as propylene, butylene and amylene. The resulting product is a gasoline component with very desirable stability properties and a high octane rating.

The catalysts used commercially for alkylation are sulfuric acid, hydrofluoric acid, and, only to a very small extent, aluminum chloride promoted with hydrochloric acid. The reaction may be achieved thermally; then, however, a pressure of 3,000–8,000 psig is required. On the other hand, if a catalyst is used, much lower temperatures and much lower pressures may be employed. Sulfuric acid alkylation units, for instance, usually are operated at near atmospheric pressure.

Temperature is an important variable in alkylation. If the temperature is allowed to exceed 70°F in a sulfuric acid catalyzed alkylation, undesirable oxidation of the hydrocarbons occurs. With hydrofluoric acid, higher temperatures are permitted, although better octane ratings are achieved at lower temperatures. Typical operating temperatures for sulfuric acid alkylation are between 45° and 60°F and for hydrofluoric acid alkylation, between 70° and 90°F.

A typical flow scheme for an alkylation process is shown in U.S. Pat. No. 2,971,037. After contacting the isoparaffin and olefin with an alkylation catalyst in a reaction zone, the reaction zone effluent mix is passed to an initial separation zone. In the initial separation zone isoparaffin is separated from the reaction zone effluent mix. The isoparaffin is recycled to the reaction zone and the remaining heavier stream, rich in product alkylate, is sent to a product separation zone wherein product alkylate is separated from heavier hydrocarbons. In addition to the use of hydrofluoric acid and sulfuric acid as alkylation catalysts various other catalysts have been proposed. For example, U.S. Pat. No. 2,966,535 suggested use of an aluminum chloride catalyst associated with a support comprising an inorganic oxide of molybdenum. U.S. Pat. No. 2,978,524 also proposes the use of a solid catalyst, in particular a silica gel and aluminum chloride.

U.S. Pat. No. 3,239,577 uses a solid catalyst comprising platinum on a refractory oxide and combined halogen. The process of U.S. Pat. No. 3,239,577 is directed to the preparation of branched chain paraffins in a chain reaction. According to the process of U.S. Pat. No. 3,239,577 at least a portion of the reaction zone effluent is continuously recycled to the reaction zone. The process of U.S. Pat. No. 3,239,577 comprises passing to a reaction zone a paraffin hydrocarbon in admixture with a small amount of halide promoter and not more than 3 weight percent olefin activator, contacting the admixture with the platinum-alumina-halogen catalyst in the presence of isobutane, withdrawing from said reaction zone a reaction zone effluent, continuously recycling at least a portion of said effluent to said reaction zone for further contacting with said catalyst, and subsequently recovering the resultant product.

Other patents which disclose the use of a solid catalyst include: U.S. Pat. No. 3,456,034, "Ethylene Alkylation with Aluminum Fluoride Supported on Silica-Alumina Gel"; U.S. Pat. No. 3,523,142, "Alkane-Olefin Alkylation with Gamma-Alumina Catalyst Activated with Chlorine or Bromine"; and U.S. Pat. No. 3,541,180, "Alkylation of Isobutene with Ethylene or Propylene and with an Alumino-silicate Catalyst."

The use of liquid phase HF antimony pentafluoride for hydrocarbon conversion reactions such as isomerization, alkylation and polymerization is disclosed in U.S. Pat. No. 3,201,494.

U.S. Pat. No. 3,394,202, "Isomerization Process Utilizing a Supported Hexafluoro Antimony Acid Catalyst," is directed to isomerization but discloses that in general HF antimony pentafluoride catalyst may be used for "any acid catalyzed hydrocarbon conversion, for example, isomerization, alkylation, polymerization, cracking, disproportionation, etc." Similar to U.S. Pat. No. 3,394,202, U.S. Pat. No. 3,678,120 is also directed to the use of a supported HF antimony pentafluoride catalyst.

SUMMARY OF THE INVENTION

According to the present invention a process is provided for alkylating olefins with isoparaffins which process comprises:

feeding a net feed of a $C_2$, $C_3$, $C_4$ or $C_5$ olefin or mixtures thereof and a $C_4$, $C_5$, $C_6$ or $C_7$ isoparaffin or mixtures thereof to a reaction zone, and therein contacting the olefin and isoparaffin with a catalyst comprising HF antimony pentafluoride supported on a porous solid base under reaction conditions including a temperature between 10°C and 60°F, an olefin LHSV through the reaction zone of between 0.25 and 0.9, and an olefin content in the olefin-isoparaffin net feed of between 1 and 15 volume percent, withdrawing reaction zone effluent mix from the reaction zone, and recycling a portion of the reaction zone effluent mix amounting to at least 2 parts per each part of the olefin isoparaffin net feed.

The present invention among other factors is based on my finding that specific reaction conditions, especially including the use of a relatively low temperature, preferably in the range of about 35°F, in combination with the use of an olefin LHSV between 0.25 and 0.9, and the recycle of a portion of the reaction zone effluent, are important to achieving a steady high octane product from an olefin-isoparaffin alkylation process using a solid supported HF antimony pentafluoride catalyst. I have found that the solid catalyst used in the process of the present invention operates surprisingly well for alkylation at relatively low temperatures compared to other solid catalysts and that the solid catalyst used in the alkylation process of the present invention can achieve very long life as well as relatively low catalyst consumption.

Among other factors, the present invention is based on the finding that a superior hydrocarbon conversion catalyst can be obtained by highly fluoriding the alumina support of the present catalyst before HF-antimony pentafluoride is added to the catalyst.

The maximum theoretical amount of fluorine which can be put into an alumina support is about 67.8 weight percent fluorine, calculated as F. This maximum theoretical possible fluorine assumes that all of the $Al_2O_3$ is converted to $AlF_3$. Putting only a thin layer of fluorine on the surface would probably result in only about 10–30 weight percent fluorine for the fluorided alumina. In contrast to this, the most preferred catalyst of the present invention is a fluorided alumina support having at least 62 weight percent fluorine.

Also, in the area of catalysis, one normally expects that it is most desirable to have a relatively high surface area. However, I have found that the better hydrocarbon conversion catalyst system for HF-antimony pentafluoride on fluorided alumina is achieved by using a relatively low surface area fluorided alumina support, namely a surface area less than 10 $m^2/gm$. For example, preferred surface areas for the catalyst of the present invention are between 0.1 and 10 $m^2/gm$., more preferably between 1 and 5 $m^2/gm$. The low surface area is believed to result from the high degree of fluoriding required for the fluorided alumina support for the catalyst of the present invention.

Although the surface area of the catalyst is especially preferred to be below 10 $m^2/gm$., it is nonetheless strongly preferred that the fluorided alumina support be porous, having a pore volume between 0.05 and 0.7 cc per gram of support, more preferably between 0.1 and 0.5 cc's per gram of support, and still more preferably between 0.3 and 0.5 cc's per gram of support.

The alumina support for the catalyst can be fluorided in gas phase by contacting the alumina with anhydrous hydrogen fluoride. Alternately, it has been found that a preferred means of fluoriding alumina support is by contacting the alumina with liquid anhydrous hydrogen fluoride under a blanket of liquid pentane.

In the process of the present invention it is particularly preferred to maintain a high isoparaffin content in the reaction zone and a relatively low normal paraffin concentration. The use of high concentrations of isobutane, and hence high isobutane recycle rates to the reaction zone, is especially preferred.

The term "LHSV" is used herein to mean liquid hourly space velocity, which is the liquid volume of specified feed or feed component per hour per volume of catalyst. Thus the units of LHSV are $hours^{-1}$. The volume of catalyst referred to is the superficial space occupied by the catalyst — the void fraction between the catalyst pellets in the case of a fixed catalyst bed is included in this superficial space occupied by the catalyst. In the process of the present invention the olefin space velocity through the reaction zone must be between 0.25 and 0.9. Preferably the olefin space velocity is between 0.3 and 0.7.

Preferably the olefin-isoparaffin net feed to the reaction zone is in an amount sufficient to maintain a net feed LHSV through the reaction zone of between 6 and 30 $hours^{-1}$.

The process of the present invention requires recycling a portion of the reaction zone effluent mix to the gross feed to the reaction zone. However the net feed contact time is determined by the fresh feed rate and the catalyst volume. The net feed contact time is independent of the recycle rate. Thus the net olefin feed LHSV is independent of the recycle rate and the olefin-isoparaffin net feed LHSV is independent of the recycle rate.

The temperature in the reaction zone in the process of the present invention must be between 10° and 60°F. Preferably the temperature is between 20° and 45°F.

Olefin in the net feed to the reaction zone is between 1 and 15 volume percent. Preferably the olefin content in the net feed is between 4 and 10 volume percent. The balance of the net feed is a $C_2-C_7$ isoparaffin, preferably isobutane.

The catalyst used in the reaction zone is a solid catalyst supported on a solid material such as charcoal or an inorganic refractory oxide such as alumina. Preferably the HF-antimony pentafluoride catalyst component is supported on fluorided alumina, especially a fluorided alumina as described in my U.S. Pat. application Ser. No. 324,924, filed Jan. 19, 1973.

BRIEF DESCRIPTION OF THE DRAWING

The drawing is a schematic process flow diagram of a preferred embodiment of the present invention.

FURTHER DESCRIPTION AND EXAMPLES

Referring now in more detail to the drawing, net isoparaffin feed in line 1 is combined with net olefin feed in line 2. The combined feeds are further combined with reaction zone effluent mix recycle as shown by line 4. The olefin-isoparaffin net feed and the recycle are passed via line 5 to reactor 6. In reactor 6 the alkylation reaction occurs by contacting the isoparaffin and olefin with the HF-antimony pentafluoride catalyst under the reaction conditions in accordance with the invention as described above. Reaction zone effluent is withdrawn via line 8. A portion of the reaction zone effluent is recycled via line 4, and a remaining portion is withdrawn via line 9, for further downstream processing as, for example, fractional distillation to obtain a product alkylate and to obtain isoparaffin for recycle to reactor 6. The recycle isoparaffin obtained by fractional distillation is not to be confused with the recycle of the overall reaction zone effluent mix as indicated by line 4.

Referring now to exemplary data, Tables 1, 2 and 3 show data for an alkylation run designated as Run 125–183. The data for the run is broken up in terms of Periods 1 through 9. Run 125–183 was started in Period 1 at 50°F with 90 wt. percent isobutane in the reaction mix hydrocarbon and 0.12 olefin LHSV.

The olefin LHSV was increased from 0.12 to 0.30 in Period 2. This caused a decrease in product isomerization and a resultant increase in octane number from 82.1 to 87.7 octane. However, after equilibration to the new conditions, the catalyst was still activating as indicated by a downtrend in octane number.

Decreasing the temperature to 30°F in Period 3 caused still a further increase in octane number with continuous uptrend. These findings support the surprisingly great importance of use of narrowly controlled feed olefin concentration and reaction zone temperature in accordance with the present invention.

A further increase of olefin LHSV to 0.6 was made in Period 4. The octane number was increased from 90 to 94, with the octane number trending up in time. Decreasing the olefin LHSV to 0.18 in Period 5 further verified that increasing contact time increased product isomerization and decreased the octane number.

In Period 6, the olefin LHSV was increased to 0.3 resulting in an increased octane number and a continuing octane number uptrend.

In Period 7, after a further increase in olefin LHSV to 0.44, an octane number of 96.4 was attained. These findings in Periods 4, 5, 6 and 7 re olefin LHSV effect on product octane, show the importance of using an olefin LHSV of above 0.25 in the process of the present invention. The increase in octane is believed due to the lower contact time for the olefin-isoparaffin with the catalyst in the reaction zone; lower contact time is achieved by higher olefin space velocity at a given olefin concentration in the feed. The process of the present invention is preferably operated at the highest feasible net feed to minimize isomerization and thereby obtain a higher octane product than is achieved with substantial simultaneous isomerization during the alkylation reaction. Further in this connection, it is especially preferred in the process of the present invention to correlate temperature and net feed contact time; at higher temperatures the net feed contact time should be lower.

Referring again to the tables, at 385 hours of operation, some olefin appeared in the product, indicating an olefin utilization of 99.97 percent. The temperature was raised to 40°F in Period 8, increasing the olefin utilization to 100 percent. The octane number dropped one number. However, uptrend in the octane number due to continued slow catalyst deactivation caused most of this to be regained as operation continued to 476 hours. At this point, the olefin utilization had dropped to 99.8 percent. The catalyst consumption at this point was only 0.020 lb HF—SbF$_5$ per gallon alkylate.

TABLE 1

Alkylation of Butene-2 by Isobutane with the Ultimer Catalyst
125–183

| Run No. | | | | | | | | |
|---|---|---|---|---|---|---|---|---|
| Catalyst | | | | | | | | |
| Treated alumina base | B682-34, | 67.9 wt.% of catalyst, 63.6 wt.% fluorine, 3 m²/g. surface area | | | | | | |
| Liquid acid phase | | 32.1 wt.% of catalyst, 73.9 wt.% SbF$_5$, 26.1 wt.% HF | | | | | | |
| Temp. °F | | 50 | | | 50 | | | 30 |
| Vol.% olefin in feed | | 4.53 | | | 4.53 | | | 4.53 |
| Wt.% isobutene in R.M. (calc.) | | | | | | | | |
| Vol. feed/vol. cat./hr. | | 2.67 | | | 6.65 | | | 6.65 |
| Vol. olefin/vol. cat./hr. | | 0.12 | | | 0.30 | | | 0.30 |
| Vol. R.M. recycle/vol. feed | | 93.8 | | | 57.5 | | | 57.5 |
| Period | | 1 | | | 2 | | | 3 |
| Hours operation | 0–316.5 | 8.5 | 47.0 | 142.2 | 155.7 | 167.7 | 177.7 | 195.3 |
| Analysis, wt.% | Feed | C$_5$+ Prod. | C$_5$+ Prod. | C$_5$+ Prod. | C$_5$+ Prod. | C$_5$+ Prod. | C$_5$+ Prod. | C$_5$+ Prod. |
| iC$_4$ | 95.07 | — | — | — | — | — | — | — |
| nC$_4$ | — | — | — | — | — | — | — | — |
| Butene-2 | 4.93 | — | — | — | — | — | — | — |
| iC$_5$ | — | 2.72 | 4.66 | 11.13 | 6.91 | 8.12 | 5.00 | 3.54 |
| nC$_5$ | — | 0.03 | 0.17 | 0.43 | 0.21 | 0.18 | 0.04 | 0.02 |
| 2,2DMB | — | 0.09 | 0.30 | 0.63 | 0.35 | 0.32 | 0.12 | 0.07 |
| 2,3DMB | — | 0.75 | 0.51 | 1.53 | 1.00 | 1.08 | 0.95 | 0.77 |
| 2MP | — | 0.11 | 0.42 | 1.78 | 1.08 | 1.36 | 0.85 | 0.56 |
| 3MP | — | 0.07 | 0.23 | 0.68 | 0.41 | 0.53 | 0.31 | 0.19 |
| nC$_6$ | — | — | 0.01 | 0.07 | 0.03 | 0.04 | — | — |
| 2,4DMP + 22DMP | — | 0.85 | 0.81 | 1.82 | 1.43 | 1.59 | 1.39 | 1.14 |
| 2,2,3TMB | — | — | — | 0.15 | 0.09 | 0.09 | — | — |
| 2,3DMP + 33DMP | — | 0.44 | 0.76 | 1.98 | 1.29 | 1.58 | 1.06 | 0.77 |
| 3MHx | — | 0.01 | 0.21 | 0.61 | 0.37 | 0.50 | 0.27 | 0.17 |
| 2,2,4TMP | — | 53.22 | 46.85 | 30.15 | 40.14 | 35.45 | 41.21 | 45.68 |
| 2,5 + 2,4 + 2,2DMHx | — | 7.76 | 13.70 | 20.68 | 14.57 | 18.36 | 17.17 | 15.28 |
| 2,3,4TMP | — | 15.94 | 12.07 | 6.08 | 11.49 | 9.26 | 10.60 | 11.37 |
| 2,3,3TMP | — | 11.51 | 11.56 | 7.54 | 9.75 | 9.01 | 10.64 | 11.99 |
| 2MHp | — | 2.58 | 2.92 | 2.71 | 2.82 | 2.90 | 2.64 | 2.53 |
| 4MHp + 3,4DMHx | — | 0.43 | 2.40 | 4.34 | 2.80 | 3.63 | 2.21 | 1.77 |
| 3MHp | — | 0.03 | 1.00 | 2.12 | 1.28 | 1.72 | 0.90 | 0.66 |
| 2,2,5TMHx | — | 1.38 | 0.75 | 2.60 | 1.44 | 1.80 | 1.67 | 1.26 |
| C$_8$+ (ex 2,2,5TMHx) | — | 2.07 | 0.67 | 2.96 | 2.51 | 2.48 | 2.96 | 2.21 |
| % Butene alkylated (estimated) | | 100 | 100 | 100 | 100 | 100 | 100 | 100 |
| F-1 Octane No. | | 94.7 | 89.5 | 82.1 | 87.7 | 84.7 | 87.8 | 89.8 |

TABLE 2

Alkylation of Butene-2 by Isobutane with the Ultimer Catalyst
125–183

| Run No. | | | | | | | |
|---|---|---|---|---|---|---|---|
| Catalyst | | | | | | | |
| Treated alumina base | B682-34, | 67.9 wt.% of catalyst, 63.6 wt.% fluorine, 3 m²/g. surface area | | | | | |
| Liquid acid phase | | 32.1 wt.% of catalyst, 73.9 wt.% SbF$_5$, 26.1 wt.% HF | | | | | |
| Temp. °F | | 30 | | | 30 | | 30 |
| Vol.% olefin in feed | | 4.53 | | | 4.53 | | 4.53 |
| Wt.% isobutene in R.M. (calc.) | | | | | | | |
| Vol. feed/vol. cat./hr. | | 13.3 | | | 4.0 | | 6.65 |
| Vol. olefin/vol. cat./hr. | | 0.60 | | | 0.18 | | 0.30 |
| Vol. R.M. recycle/vol. feed | | 28.8 | | | 96 | | 57.5 |
| Period | | 4 | | | 5 | | 6 |
| Hours operation | | 201.0 | 216.3 | 234.3 | 289.1 | 295.1 | 316.4 | 316.5–501 |
| Analysis, wt.% | | C$_5$+ Prod. | C$_5$+ Prod. | C$_5$+ Prod. | C$_5$+ Prod. | C$_5$+ Prod. | C$_5$+ Prod. | Feed |
| iC$_4$ | | — | — | — | — | — | — | 95.55 |
| nC$_4$ | | — | — | — | — | — | — | — |
| Butene-2 | | — | — | — | — | — | — | 4.45 |
| iC$_5$ | | 3.38 | 2.19 | 3.02 | 2.41 | 1.86 | 1.52 | — |
| nC$_5$ | | 0.01 | — | 0.02 | — | — | — | — |
| 2,2DMB | | 0.04 | 0.02 | 0.07 | 0.02 | 0.01 | — | — |

TABLE 2—Continued

Alkylation of Butene-2 by Isobutane with the Ultimer Catalyst

| | | | | | | | |
|---|---|---|---|---|---|---|---|
| 2,3DMB | 1.37 | 1.05 | 0.63 | 0.70 | 0.72 | 0.69 | — |
| 2MP | 0.43 | 0.26 | 0.46 | 0.14 | 0.21 | 0.15 | — |
| 3MP | 0.14 | 0.08 | 0.16 | 0.10 | 0.06 | 0.04 | — |
| $nC_6$ | — | — | — | — | — | — | — |
| 2,4DMP + 22DMP | 1.60 | 1.24 | 1.05 | 1.03 | 1.03 | 0.97 | — |
| 2,2,3TMB | — | — | — | — | — | — | — |
| 2,3DMP + 33DMP | 0.73 | 0.54 | 0.66 | 0.55 | 0.46 | 0.38 | — |
| 3MHx | 0.09 | 0.04 | 0.14 | 0.07 | 0.04 | 0.02 | — |
| 2,2,4TMP | 47.42 | 47.01 | 48.00 | 50.10 | 51.65 | 52.27 | — |
| 2,5 + 2,4 + 2,2DMHx | 10.29 | 8.55 | 15.35 | 15.37 | 10.93 | 9.61 | — |
| 2,3,4TMP | 14.90 | 16.82 | 10.69 | 10.37 | 13.38 | 14.13 | — |
| 2,3,3TMP | 12.35 | 13.13 | 12.89 | 13.11 | 13.64 | 14.21 | — |
| 2MHp | 2.34 | 2.46 | 2.39 | 2.38 | 2.24 | 2.24 | — |
| 4MHp + 3,4DMHx | 1.01 | 0.85 | 1.58 | 0.93 | 0.92 | 0.78 | — |
| 3MHp | 0.30 | 0.22 | 0.56 | 0.16 | 0.24 | 0.17 | — |
| 2,2,5TMHx | 1.26 | 1.32 | 0.92 | 0.99 | 0.76 | 0.65 | — |
| $C_9$ + (ex 2,2,5TMHx) | 2.35 | 4.21 | 1.41 | 1.56 | 1.78 | 2.16 | — |
| % Butene alkylated (estimated) | 100 | 100 | 100 | 100 | 100 | 100 | — |
| F-1 Octane No. | 92.9 | 93.8 | 90.3 | 91.3 | 93.5 | 94.5 | — |

TABLE 3

Alkylation of Butene-2 by Isobutane with the Ultimer Catalyst

| Run No. | 125-183 | | | |
|---|---|---|---|---|
| Catalyst | | | | |
| Treated alumina base | B682-34, 67.9 wt.% of catalyst, 63.6 wt.% fluorine, 3 m²/g. surface area | | | |
| Liquid acid phase | 32.1 wt.% of catalyst, 73.9 wt.% $SbF_5$, 26.1 wt.% HF | | | |
| Temp. °F | 30 | | 40 | |
| Vol.% olefin in feed | 4.09 | | 4.09 | |
| Wt.% isobutene in R.M. (calc.) | | | | |
| Vol. feed/vol. cat./hr. | 10.67 | | 10.67 | |
| Vol. olefin/vol. cat./hr. | 0.437 | | 0.437 | |
| Vol. R.M. recycle/vol. feed | 34.4 | | 34.4 | |
| Period | 7 | | 8 | |
| Hours operation | 319.5 | 385.5 | 391.5 | 475.7 |
| Analysis, wt.% | $C_5$+ Prod. | $C_5$+ Prod. | $C_5$+ Prod. | $C_5$+ Prod. |
| $iC_4$ | — | — | — | — |
| $nC_4$ | — | — | — | — |
| Butene-2 | — | — | — | — |
| $iC_5$ | 1.40 | 1.12 | 1.56 | 1.77 |
| $nC_5$ | — | — | 0.01 | — |
| 2,2DMB | — | — | 0.81 | 0.92 |
| 2,3DMB | 0.86 | 0.76 | 0.81 | 0.92 |
| 2MP | 0.12 | 0.09 | 0.16 | 0.20 |
| 3MP | 0.04 | 0.02 | 0.05 | 0.07 |
| $nC_6$ | — | — | — | — |
| 2,4DMP + 22DMP | 1.12 | 0.91 | 1.12 | 1.23 |
| 2,2,3TMB | — | — | — | — |
| DMP + 33DMP | 0.40 | 0.30 | 0.41 | 0.48 |
| 3MHx | 0.01 | — | 0.02 | 0.03 |
| 2,2,4TMP | 52.31 | 52.09 | 51.92 | 48.86 |
| 2,5 + 2,4 + 2,2DMHx | 7.71 | 5.09 | 7.21 | 5.06 |
| 2,3,4TMP | 16.22 | 19.39 | 16.98 | 21.18 |
| 2,3,3TMP | 13.82 | 13.46 | 13.49 | 12.30 |
| 2MHp | 2.22 | 2.20 | 2.39 | 2.49 |
| 4MHp + 3,4DMHx | 0.64 | 0.46 | 0.66 | 0.53 |
| 3MHp | 0.12 | — | 0.12 | 0.10 |
| 2,2,5TMHx | 0.51 | 0.83 | 0.82 | 1.17 |
| $C_9$ + (ex 2,2,5TMHx) | 2.20 | 3.27 | 2.27 | 3.56 |
| % Butene alkylated (estimated) | 100 | 99.97 | 100 | 99.80 |
| F-1 Octane No. | 95.3 | 96.4 | 95.3 | 95.8 |

Tables 4, 5, 6 and 7 show further exemplary data for an alkylation run designated as Run 125-173.

The drop in octane number shown in Period 1 of Run 125-173 is associated with a decrease in isobutane concentration caused by the displacement of the isobutane initially in the reactor system by the feed at the start of the run. The high olefin content of the feed and resultant high alkylate concentration in the reaction mix at the high initial catalyst activity results in a high concentration of $C_5$-$C_7$ and $C_9$+ fractions by disproportionation, redistribution, and polymerization. The increase in octane number following the initial decrease in octane number correlates with a decrease in $C_5$-$C_7$ fraction and an increase in the $C_8$ fraction, primarily trimethylpentanes. This indicates decreasing redistribution of $C_8$ with isobutane, as shown by a decreasing isobutane consumption and also decreasing $C_8$ isomerization with time. We believe that this is caused by a decreasing catalyst activity.

In Period 2, the olefin concentration in the feed was dropped from 14.2 to 4.9 percent and the octane increased from 84.5 to 89.2. Fresh feed rate was increased so that the olefin concentration in the net feed to the reactor inlet was unchanged. The isobutane concentration in the reaction mix hydrocarbon was only changed from 68–72 percent as the olefin in the Period 1 feed was replaced by relatively inert n-butane. The major changes were a decrease in the alkylate concentration by a factor of 2.9 and a decrease in the feed contact time by a factor of 3. The net effect was an increase in octane number.

The change in conditions from Period 2 to Period 3 was a decrease in the fresh feed rate which increased the feed contact time by a factor of 3 and decreased the olefin concentration at the reactor inlet by a factor of 3. The decrease in feed contact time increased the redistribution of isobutane with $C_8$ alkylate to increase the $C_5$-$C_7$ fraction and increased the isomerization of trimethylpentanes to dimethylhexanes. The decreased olefin concentration at the reactor inlet resulted in an advantageous decrease in $C_9+$ bottoms.

In Period 4, the temperature was decreased from 50°F to 45°F. This caused an increase of about 1 octane number by decreasing side reactions and increasing the trimethylpentane content of the product. The octane number continued to increase with time in this period also.

The olefin LHSV was increased from 0.29 to 0.93 in Period 5 by increasing the fresh feed rate. This increased the olefin concentration at the reactor inlet by a factor of 3 and decreased the feed contact time by a factor of 3 also. The increased olefin concentration caused a disadvantageous increase in $C_9+$ bottoms from 2.6 to 5.2 percent. However, the decreased contact time decreased the isomerization of the trimethylpentanes to low octane number, dimethylhexanes, and methyl heptanes and the F-1 octane number was increased from 87.7 to 91.5. This is similar to the effects seen in Period 2.

In Period 6 the isobutane concentration in the reaction mix was increased from 71 to 90 percent, and the olefin LHSV was decreased to 0.15 by decreasing the fresh feed rate. The olefin concentration in the reactor inlet was decreased to one-sixth of the olefin concentration of Period 5. The feed contact time was increased by a factor of 6. This reversed the effect seen in Period 5. The $C_9+$ bottoms decreased from 5.2 to 0.5 percent, but the dimethylhexane and methylheptane contents of the $C_8$ product increased with a resultant decrease in octane number. The octane number continued to improve throughout this period because of decreasing isomerization to dimethylhexanes and methylheptanes.

The olefin LHSV was increased to 1.93 by increasing the feed rate in Period 7. This increased the olefin concentration at the reactor inlet by a factor of 12 at one-twelfth the contact time of the previous period. The octane number was increased to 93.9. For a short duration, the olefin was completely reacted even at this high olefin space rate. The $C_9+$ bottoms increased from 0.4 to 7.8 percent, and the dimethylhexane and methylheptane contents of the $C_8$ fraction were reduced significantly.

The olefin LHSV was reduced to 0.3 in Period 8, reducing the octane number from 93.9 to 92.7. At the end of the period, 24 hours later, the octane number was 93.5; and the olefin was still completely reacted.

The olefin LHSV was increased to 3.38 in Period 9 to further test the olefin space rate effects for short duration. At this point, the olefin was only 75 percent reacted, the $C_9+$ bottoms content increased to 24 percent, and the octane number dropped to 90.4. This led to a situation where the octane number dropped continuously, and alkylation was no longer complete even after reducing the olefin LHSV to 0.075 and increasing the temperature to 100°F.

TABLE 4

Alkylation of Butene-2 by Isobutane with the Ultimer Catalyst (62% F on Catapal alumina base)

| Run No. | | | 125–173 | | | |
|---|---|---|---|---|---|---|
| Catalyst | | | | | | |
| Treated alumina base | | | B682-22, 62.0 wt.% of catalyst, 62.0 wt.% flourine, <10 m²/g. surf. area | | | |
| Liquid acid phase | | | 38.0 wt.% of catalyst, 73.7 wt.% SbF₅, 26.3 wt.% HF | | | |
| Temp. °F | | | 49 | | 50 | |
| Vol.% olefin in feed | | | 13.15 | | 4.50 | |
| Wt.% isobutene in R.M. (calc.) | | | 68 | | 21.3 | |
| Vol. feed/vol. cat./hr. | | | 6.67 | | 21.3 | |
| Vol. olefin/vol. cat./hr. | | | 0.88 | | 0.96 | |
| Vol. R.M. recycle/vol. feed | | | 57 | | 18 | |
| Period | | | 1 | | 2 | |
| Hours operation | 0–23 | 7.9 | 19.9 | 23–50 | 27.0 | 29.7 |
| Analysis, wt.% | Feed | C₅+ Prod. | C₅+Prod. | Feed | C₅+ Prod. | C₅+ Prod. |
| iC₄ | 85.75 | — | — | 76.99 | — | — |
| nC₄ | — | — | — | 18.12 | — | — |
| Butene-2 | 14.25 | — | — | 4.89 | — | — |
| iC₅ | — | 15.74 | 11.42 | — | 7.04 | 6.61 |
| nC₅ | — | 1.19 | 0.36 | — | 0.21 | 0.17 |
| 2,2DMB | — | 1.84 | 0.52 | — | 0.09 | 0.07 |
| 2,3DMB | — | 2.77 | 2.44 | — | 1.92 | 1.91 |
| 2MP | — | 4.26 | 2.65 | — | 1.04 | 0.97 |
| 3MP | — | 1.87 | 1.13 | — | 0.41 | 0.38 |
| nC₆ | — | 0.28 | 0.08 | — | 0.01 | 0.01 |
| 2,4DMP + 22DMP | — | 2.75 | 2.80 | — | 2.38 | 2.40 |
| 2,2,3TMB | — | 0.46 | 0.25 | — | 0.15 | 0.13 |
| 2,3DMP + 33DMP | — | 3.48 | 2.61 | — | 1.55 | 1.53 |
| 3MHx | — | 1.36 | 0.88 | — | 0.31 | 0.28 |
| 2,2,4TMP | — | 13.64 | 20.42 | — | 35.17 | 36.34 |
| 2,5 + 2,4 + 2,2DMHx + 33 DMHx | — | 14.34 | 15.07 | — | 13.62 | 13.73 |
| 2,3,4TMP | — | 2.75 | 4.49 | — | 9.97 | 10.24 |
| 2,3,3TMP | — | 3.79 | 6.34 | — | 10.71 | 10.87 |
| 2MHp | — | 1.84 | 2.21 | — | 2.63 | 2.70 |
| 4MHp + 3,4DMHx | — | 3.40 | 2.42 | — | 1.64 | 1.58 |
| 3MHp | — | 1.82 | 1.15 | — | 0.62 | 0.66 |
| 2,2,5TMHx | — | 6.75 | 7.39 | — | 3.42 | 3.29 |
| C₉+ (ex 2,2,5TMHx) | — | 15.50 | 15.23 | — | 7.12 | 6.13 |
| Mols isobutane consumed/mol butene | — | 1.24 | 1.19 | — | 1.08 | 1.08 |
| % Butene alkylated (estimated) | — | 100 | 100 | — | 100 | 100 |
| F-1 Octane No. | — | 82.3 | 84.5 | — | 89.2 | 89.8 |

TABLE 5

Alkylation of Butene-2 by Isobutane with the Ultimer Catalyst (62% F on Catapal alumina base)

| Run No. | | | 125-173 | | | |
|---|---|---|---|---|---|---|
| Catalyst | | | | | | |
| Treated alumina base | B-682-22, 62.0 wt.% of catalyst, 62.0 wt.% fluorine, <10 m²/g. surf. area | | | | | |
| Liquid acid phase | 38.0 wt.% of catalyst, 73.7 wt.% SbF₅, 26.3 wt.% HF | | | | | |
| Temp. °F | 50 | | | 45 | | 45 |
| Vol.% olefin in feed | 4.50 | | | 4.35 | | 4.35 |
| Wt.% isobutene in R.M. (calc.) | 71 | | | 71 | | 71 |
| Vol. feed/vol. cat./hr. | 6.67 | | | 6.67 | | 21.3 |
| Vol. olefin/vol. cat./hr. | 0.30 | | | 0.29 | | 0.93 |
| Vol. R.M. recycle/vol. feed | 57 | | | 57 | | 18 |
| Period | 3 | | | 4 | | 5 |
| Hours operation | 32.7 | 47.8 | 50–75 | 50.8 | 69.0 | 75.0 |
| Analysis, wt.% | C₅+ Prod. | C₅+ Prod. | Feed | C₅+ Prod. | C₅+ Prod. | C₅+ Prod. |
| iC₄ | — | — | 76.36 | — | — | — |
| nC₄ | — | — | 18.92 | — | — | — |
| Butene-2 | — | — | 4.72 | — | — | — |
| iC₅ | 10.52 | 9.38 | — | 8.60 | 7.12 | 6.45 |
| nC₅ | 0.22 | 0.19 | — | 0.16 | 0.11 | 0.17 |
| nC₅ | 0.22 | 0.19 | — | 0.16 | 0.11 | 0.17 |
| 2,2DMB | 0.30 | 0.26 | — | 0.22 | 0.16 | 0.07 |
| 2,3DMB | 1.28 | 1.18 | — | 1.14 | 1.03 | 2.09 |
| 2MP | 1.75 | 1.54 | — | 1.36 | 1.08 | 0.80 |
| 3MP | 0.71 | 0.63 | — | 0.54 | 0.43 | 0.32 |
| nC₆ | 0.04 | 0.03 | — | 0.02 | 0.01 | 0.01 |
| 2,4DMP + 22DMP | 1.86 | 1.76 | — | 1.68 | 1.58 | 2.36 |
| 2,2,3TMB | 0.10 | 0.09 | — | 0.08 | 0.07 | 0.13 |
| 2,3DMP + 33DMP | 1.94 | 1.77 | — | 1.58 | 1.34 | 1.26 |
| 3MHx | 0.61 | 0.55 | — | 0.47 | 0.36 | 0.18 |
| 2,2,4TMP | 30.73 | 32.91 | — | 35.59 | 38.77 | 40.57 |
| 2,5 + 2,4 + 2,2DMHx + 33 DMHx | 21.50 | 20.60 | — | 19.76 | 19.02 | 10.56 |
| 2,3,4TMP | 5.60 | 5.90 | — | 6.40 | 7.48 | 11.95 |
| 2,3,3TMP | 8.65 | 9.17 | — | 9.84 | 10.98 | 11.58 |
| 2MHp | 2.87 | 2.88 | — | 2.78 | 2.76 | 2.39 |
| 4MHp + 3,4DMHx | 3.22 | 3.03 | — | 2.71 | 2.20 | 1.02 |
| 3MHp | 1.50 | 1.38 | — | 1.19 | 0.90 | 0.31 |
| 2,2,5TMHx | 3.01 | 2.85 | — | 2.74 | 2.04 | 2.63 |
| C₉+ (ex 2,2,5TMHx) | 3.59 | 3.47 | — | 3.15 | 2.56 | 5.19 |
| Mols isobutane consumed/mol butene | 1.16 | 1.14 | — | 1.12 | 1.10 | 1.02 |
| % Butene alkylated (estimated) | 100 | 100 | — | 100 | 100 | 100 |
| F-1 Octane No. | 84.6 | 85.3 | — | 86.4 | 87.7 | 91.6 |

TABLE 6

Alkylation of Butene-2 by Isobutane with the Ultimer Catalyst (62% F on Catapal alumina base)

| Run No. | | | 125-173 | | | |
|---|---|---|---|---|---|---|
| Catalyst | | | | | | |
| Treated alumina base | B682-22, 62.0 wt.% of catalyst, 62.0 wt.% fluorine, <10 m²/g. surf. area | | | | | |
| Liquid acid phase | 38.0 wt.% of catalyst, 73.7 wt.% SbF₅, 26.3 wt.% HF | | | | | |
| Temp. °F | | | 45 | 45 | | 45 |
| Vol.% olefin in feed | | | 4.53 | 4.53 | | 4.53 |
| Wt.% isobutene in R.M. (calc.) | | | 90 | 90 | | 90 |
| Vol. feed/vol. cat./hr. | | | 3.33 | 42.6 | | 6.67 |
| Vol. olefin/vol. cat./hr. | | | 0.15 | 1.93 | | 0.30 |
| Vol. R.M. recycle/vol. feed | | | 120 | 9.4 | | 60 |
| Period | | | 6 | 7 | | 8 |
| Hours operation | 75–246 | 84.3 | 141.8 | 145.8 | 151.8 | 168.1 |
| Analysis, wt.% | Feed | C₅+ Prod. | C₅+ Prod. | C₅+ Prod. | C₅+ Prod. | C₅+ Prod. |
| iC₄ | 95.05 | — | — | — | — | — |
| nC₄ | — | — | — | — | — | — |
| Butene-2 | 4.95 | — | — | — | — | — |
| iC₅ | — | 5.12 | 3.57 | 4.98 | 3.03 | 2.59 |
| nC₅ | — | 0.05 | 0.02 | 0.11 | 0.01 | 0.00 |
| 2,2DMB | — | 0.09 | 0.04 | 0.02 | 0.02 | 0.01 |
| 2,3DMB | — | 0.66 | 0.55 | 2.40 | 0.76 | 0.62 |
| 2MP | — | 0.73 | 0.49 | 0.47 | 0.38 | 0.31 |
| 3MP | — | 0.27 | 0.18 | 0.18 | 0.14 | 0.11 |
| nC₆ | — | — | — | — | — | — |
| 2,4DMP | — | 1.10 | 0.93 | 2.57 | 1.17 | 1.02 |
| 2,2,3TMB | — | — | — | 0.15 | — | — |
| 2,3DMP | — | 0.93 | 0.69 | 1.10 | 0.68 | 0.57 |
| 3MHx | — | 0.23 | 0.16 | 0.08 | 0.11 | 0.09 |
| 2,2,4TMP | — | 44.80 | 48.75 | 39.08 | 50.26 | 51.65 |
| 2,5 + 2,4 + 2,2DMHx | — | 18.84 | 15.95 | 5.86 | 11.38 | 10.26 |
| 2,3,4TMP | — | 8.07 | 9.76 | 17.86 | 12.98 | 14.34 |
| 2,3,3TMP | — | 11.83 | 13.02 | 11.61 | 12.93 | 13.79 |
| 2MHp | — | 2.69 | 2.60 | 2.32 | 2.63 | 2.66 |
| 4MHp + 3,4DMHx | — | 2.11 | 1.67 | 0.57 | 1.22 | 1.10 |
| 3MHp | — | 0.80 | 0.59 | 0.11 | 0.38 | 0.30 |
| 2,2,5TMHx | — | 1.18 | 0.60 | 2.76 | 0.85 | 0.56 |
| C₉+ (ex 2,2,5TMHx) | — | 0.52 | 0.39 | 7.78 | 1.08 | 0.85 |
| Mols isobutane consumed/mol butene | — | 1.08 | 1.05 | 1.05 | 1.004 | 1.04 |
| % Butene alkylated (estimated) | — | 100 | 100 | 100 | 100 | 100 |
| F-1 Octane No. | — | 88.9 | 90.8 | 93.9 | 92.7 | 93.5 |

TABLE 7

Alkylation of Butene-2 by Isobutane with the Ultimer Catalyst (62% F on Catapal alumina base)

| Run No. | 125-173 | | | | | |
|---|---|---|---|---|---|---|
| Catalyst | | | | | | |
| Treated alumina base | B682-22, 62.0 wt.% of catalyst, 62.0 wt.% fluorine, <10 m²/g. surf. area | | | | | |
| Liquid acid phase | 38.0 wt.% of catalyst, 73.7 wt.% SbF$_5$, 26.3 wt.% HF | | | | | |
| Temp. °F | 47 | 45 | | 50 | | 50 |
| Vol.% olefin in feed | 4.53 | 4.53 | 4.53 | | 4.53 | 4.53 |
| Wt.% isobutene in R.M. (calc.) | 90 | 90 | | 90 | | 90 |
| Vol. feed/vol. cat./hr. | 74.7 | 6.67 | | 6.67 | | 1.67 |
| Vol. olefin/vol. cat./hr. | 3.38 | 0.30 | | 0.30 | | 0.075 |
| Vol. R.M. recycle/vol. feed | 5.3 | 60 | | 60 | | 240 |
| Period | 9 | 10 | | 11 | | 12 |
| Hours operation | 171.1 | 180.1 | 192.2 | 198.2 | 213.4 | 242.8 |
| Analysis, wt.% | C$_5$+ Prod. | C$_5$+ Prod. | C$_5$+ Prod. | C$_5$+ Prod. | C$_5$+ Prod. | C$_5$+ Prod. |
| iC$_4$ | — | — | — | — | — | — |
| nC$_4$ | — | — | — | — | — | — |
| Butene-2 | — | — | — | — | — | — |
| iC$_5$ | 5.82 | 3.11 | 3.41 | 3.90 | 4.24 | 3.66 |
| nC$_5$ | — | — | — | — | — | — |
| 2,2DMB | — | — | — | — | — | — |
| 2,3DMB | 3.06 | 1.16 | 1.67 | 2.60 | 2.32 | 1.90 |
| 2MP | 0.53 | 0.37 | 0.38 | 0.42 | 0.41 | 0.33 |
| 3MP | 0.37 | 0.19 | 0.29 | 0.37 | 0.45 | 0.30 |
| nC$_6$ | — | — | × | — | — | — |
| 2,4DMP | 2.15 | 1.50 | 1.67 | 1.67 | 1.50 | 1.46 |
| 2,2,3TMB | 0.23 | — | — | 0.15 | 0.03 | 0.01 |
| 2,3DMP | 1.72 | 0.93 | 1.38 | 1.65 | 2.05 | 1.46 |
| 3MHx | 0.06 | 0.07 | 0.04 | 0.05 | 0.06 | 0.03 |
| 2,2,4TMP | 27.08 | 45.17 | 39.46 | 32.72 | 27.18 | 33.26 |
| 2,5 + 2,4 + 2,2DMHx | 5.48 | 6.87 | 5.51 | 5.15 | 4.70 | 5.45 |
| 2,3,4TMP | 13.54 | 18.80 | 18.02 | 16.85 | 16.41 | 19.83 |
| 2,3,3TMP | 7.69 | 10.43 | 8.69 | 7.70 | 7.13 | 8.65 |
| 2MHp | 1.68 | 2.89 | 2.40 | 2.59 | 2.63 | 3.49 |
| 4MHp + 3,4DMHx | 0.15 | 0.63 | 0.12 | 0.59 | 0.49 | 0.91 |
| 3MHp | 0.70 | 0.14 | 0.22 | 0.36 | 0.57 | 0.62 |
| 2,2,5TMHx | 5.46 | 1.25 | 2.41 | 3.34 | 4.19 | 3.36 |
| C$_9$+ (ex 2,2,5TMHx) | 24.24 | 6.47 | 14.53 | 20.39 | 26.23 | 15.29 |
| Mols isobutane consumed/mol butene | 0.75 | 0.97 | 0.95 | 0.92 | 0.86 | 0.97 |
| % Butene alkylated (estimated) | 75 | 97.7 | 96.1 | 95.4 | 90.8 | 98.1 |
| F-1 Octane No. | 90.4 | 93.5 | 93.0 | 91.1 | 90.2 | 91.4 |

What is claimed is:

1. A process for alkylating olefins with isoparaffins which comprises
   feeding a net feed of a C$_2$–C$_5$ olefin or mixtures thereof and a C$_4$–C$_7$ isoparaffin or mixtures thereof to an alkylation reaction zone,
   therein contacting said feed with a catalyst comprising HF-antimony pentafluoride supported on a solid fluorided alumina base under reaction conditions including
   a temperature between 10°F and 60°F,
   an olefin LHSV through the reaction zone of between 0.25 and 0.9,
   an olefin content in said olefin-isoparaffin net feed of between 1 and 15 volume percent,
   withdrawing reaction zone effluent mix from said reaction zone, and
   recycling a portion of said reaction zone effluent mix amounting to at least 2 parts of said mix per part of the olefin-isoparaffin net feed.

2. A process in accordance with claim 1 wherein said olefin-isoparaffin net feed is passed through said reaction zone at an LHSV between 6 and 30.

3. A process in accordance with claim 1 wherein said temperature in said reaction zone is between 25°F and 45°F.

4. A process in accordance with claim 1 wherein said olefin content in said olefin-isoparaffin net feed is between 4 and 10 volume percent.

5. A process in accordance with claim 1 wherein said fluorided alumina base has a fluorine content of at least 62 weight percent.

6. A process for alkylating olefins with isoparaffins which comprises
   feeding a net feed of a C$_2$–C$_5$ olefin or mixtures thereof and a C$_4$–C$_7$ isoparaffin or mixtures thereof to an alkylation reaction zone,
   therein contacting said feed with a catalyst comprising HF-antimony pentafluoride supported on a fluorided alumina base having a fluoride content of at least 62 weight percent, said contacting being carried out under reaction conditions including
   a temperature between 20°F and 45°F,
   an olefin LHSV through the reaction zone of between 0.25 and 0.9,
   an olefin-isoparaffin net feed through said reaction zone at an LHSV between 6 and 30,
   an olefin content in said olefin-isoparaffin net feed of between 4 and 10 volume percent,
   withdrawing reaction zone effluent mix from said reaction zone, and
   recycling a portion of the reaction zone effluent mix amounting to at least 2 parts of said mix per said part of olefin-isoparaffin net feed.

* * * * *

PO-1050
(5/69)

UNITED STATES PATENT OFFICE
CERTIFICATE OF CORRECTION

Patent No. 3,852,371        Dated  December 3, 1974

Inventor(s) Jacob D. Kemp

It is certified that error appears in the above-identified patent and that said Letters Patent are hereby corrected as shown below:

Table 3, Col. 7, "DMP + 33DMP" should read --2,3DMP + 33DMP--.

Table 5, Col. 11, "Cg+(ex 2,2,5TMHx)" should read
    --$C_9$+ (ex 2,2,5TMHx)--.

Table 5, Col. 12, "1.02" last column should read --1.08--.

Table 7, Col. 13, "$nC_6$", third column "X" should read -- - --.

Claim 1, Col. 13, line 54, "the olefin" should read
    --said olefin--.

Claim 6, Col. 14, lines 57-58, "of said mix per said part of"
    should read --of said mix per part of said--.

Signed and sealed this 4th day of March 1975.

(SEAL)
Attest:

RUTH C. MASON
Attesting Officer

C. MARSHALL DANN
Commissioner of Patents
and Trademarks